United States Patent
Tanrikulu et al.

(10) Patent No.: US 10,099,239 B2
(45) Date of Patent: Oct. 16, 2018

(54) APPLICATOR DEVICE FOR FILM FORMING FORMULATION FOR TEXTURED SURFACES

(71) Applicant: SHURTAPE TECHNOLOGIES, LLC, Hickory, NC (US)

(72) Inventors: Nilufer Tanrikulu, Denver, NC (US); Pete Elafros, Hickory, NC (US)

(73) Assignee: Shurtape Technologies, LLC, Hickory, NC (US)

( * ) Notice: Subject to any disclaimer, the term of this patent is extended or adjusted under 35 U.S.C. 154(b) by 373 days.

(21) Appl. No.: 13/801,206

(22) Filed: Mar. 13, 2013

(65) Prior Publication Data

US 2013/0287475 A1    Oct. 31, 2013

Related U.S. Application Data (60) Provisional application No. 61/640,136, filed on Apr. 30, 2012.

(51) Int. Cl.
  *B05C 1/00* (2006.01)
  *C09D 133/00* (2006.01)
  (Continued)

(52) U.S. Cl.
  CPC .............. *B05C 1/00* (2013.01); *B05C 17/00* (2013.01); *C09D 133/00* (2013.01);
  (Continued)

(58) Field of Classification Search
  CPC combination set(s) only.
  See application file for complete search history.

(56) References Cited

U.S. PATENT DOCUMENTS 1,969,253 A    8/1934   Berthold
3,818,232 A    6/1974   Kirkpatrick
(Continued)

FOREIGN PATENT DOCUMENTS

CN    87210536 U    6/1988
CN    101091605 A   12/2007
(Continued)

OTHER PUBLICATIONS

"Polymer Handbook", Fourth Edition, vol. 1, Section VI, pp. 201-204, Published by John Wiley & Sons, Inc., Hoboken, New Jersey, copyright 1999.
(Continued)

*Primary Examiner* — David Walczak
(74) *Attorney, Agent, or Firm* — Nelson Mullins Riley & Scarborough LLP (57) ABSTRACT

An applicator device for a film forming formulation and method of using the applicator device with a film forming formulation for obtaining sharp paint lines on textured surfaces is described. The applicator device comprises an applicator head having an adaptor and a supply reservoir having a neck for attachment to the adaptor of the applicator head. The applicator head comprises a brush comprised of aligned bristles with the bristles affixed in a brush retainer, a brush reservoir within the brush retainer for holding the film forming formulation within the applicator head, a flow orifice to provide flow of the film forming formulation to the brush reservoir, and an adaptor for attachment to a neck of the supply reservoir for supplying the film forming formulation.

29 Claims, 7 Drawing Sheets

(51) Int. Cl.
*A46B 11/00* (2006.01)
*C09D 133/08* (2006.01)
*C09D 133/20* (2006.01)
*B05C 17/00* (2006.01)
*C09D 4/00* (2006.01)

(52) U.S. Cl.
CPC ......... *C09D 133/08* (2013.01); *C09D 133/20* (2013.01); *A46B 11/0041* (2013.01); *A46B 11/0089* (2013.01); *A46B 2200/202* (2013.01); *C09D 4/00* (2013.01)

(56) References Cited

U.S. PATENT DOCUMENTS

| | | | | |
|---|---|---|---|---|
| 3,896,822 | A | * | 7/1975 | Zimmerman ............ A46B 5/00 15/104.94 |
| 4,279,527 | A | * | 7/1981 | Moe ..................... A45D 34/042 401/186 |
| 4,432,881 | A | | 2/1984 | Evani |
| 4,514,552 | A | | 4/1985 | Shay et al. |
| 4,566,591 | A | | 1/1986 | Turtschan et al. |
| 4,954,553 | A | | 9/1990 | Johnson et al. |
| 5,314,953 | A | | 5/1994 | Corcoran et al. |
| 5,385,965 | A | | 1/1995 | Bernard et al. |
| 5,548,010 | A | | 8/1996 | Franer |
| 5,610,215 | A | | 3/1997 | Nonweiler et al. |
| 5,618,582 | A | | 4/1997 | Vanwinckel |
| 5,763,528 | A | | 6/1998 | Barsotti et al. |
| 5,939,475 | A | | 8/1999 | Reynolds et al. |
| 6,066,201 | A | | 5/2000 | Wantling |
| 6,242,526 | B1 | | 6/2001 | Siddiqui et al. |
| 6,288,148 | B1 | | 9/2001 | Samukawa et al. |
| 6,516,580 | B1 | | 2/2003 | Maietta |
| 6,540,002 | B1 | | 4/2003 | Edwards et al. |
| 6,590,019 | B2 | | 7/2003 | Dheret et al. |
| 6,630,533 | B2 | | 10/2003 | Konopka et al. |
| 6,695,190 | B1 | | 2/2004 | Gunter, Jr. et al. |
| 6,828,008 | B2 | | 12/2004 | Gruber |
| 6,960,619 | B2 | | 11/2005 | Figovsky et al. |
| 7,241,834 | B2 | | 7/2007 | Even |
| 7,318,683 | B2 | * | 1/2008 | Byun ................... A45D 34/042 401/194 |
| 7,425,102 | B1 | | 9/2008 | Velliquette |
| 7,524,910 | B2 | | 4/2009 | Jiang et al. |
| 7,629,400 | B2 | | 12/2009 | Hyman |
| 7,799,853 | B2 | | 9/2010 | Ukei et al. |
| 7,819,162 | B2 | | 10/2010 | Pool |
| 7,851,545 | B2 | | 12/2010 | Cobb |
| 7,854,562 | B2 | * | 12/2010 | Peterson .............. A46B 5/0095 401/183 |
| 7,922,410 | B2 | * | 4/2011 | Gueret ................. A45D 34/045 401/126 |
| 2002/0151648 | A1 | | 10/2002 | Fasano et al. |
| 2003/0112311 | A1 | | 6/2003 | Naik et al. |
| 2003/0207085 | A1 | | 11/2003 | Gruber |
| 2004/0020573 | A1 | | 2/2004 | Palmer |
| 2004/0126690 | A1 | | 7/2004 | Kobayashi et al. |
| 2005/0166797 | A1 | | 8/2005 | Li et al. |
| 2005/0209412 | A1 | | 9/2005 | Kitahara et al. |
| 2005/0239931 | A1 | | 10/2005 | Bolton et al. |
| 2006/0106153 | A1 | | 5/2006 | Blankenship et al. |
| 2007/0019711 | A1 | | 1/2007 | Mallinson et al. |
| 2007/0155880 | A1 | | 7/2007 | Bobsein et al. |
| 2007/0179078 | A1 | | 8/2007 | Collin et al. |
| 2007/0197114 | A1 | | 8/2007 | Grove |
| 2007/0292197 | A1 | | 12/2007 | Peterson et al. |
| 2008/0017071 | A1 | | 1/2008 | Moebus et al. |
| 2008/0058473 | A1 | | 3/2008 | Freidzon et al. |
| 2008/0090957 | A1 | | 4/2008 | Blum et al. |
| 2009/0088516 | A1 | | 4/2009 | Li et al. |
| 2009/0119175 | A1 | | 5/2009 | Richardson |
| 2009/0234062 | A1 | | 9/2009 | Kok et al. |
| 2009/0263604 | A1 | | 10/2009 | Arai et al. |
| 2009/0314429 | A1 | | 12/2009 | Hoya et al. |
| 2010/0256263 | A1 | | 10/2010 | Shah et al. |
| 2011/0076492 | A1 | | 3/2011 | Fujita et al. |
| 2011/0094443 | A1 | | 4/2011 | Karaga |
| 2011/0160395 | A1 | | 6/2011 | Conner et al. |
| 2011/0240064 | A1 | | 10/2011 | Wales et al. |
| 2011/0259355 | A1 | | 10/2011 | Ybarra et al. |
| 2011/0305916 | A1 | | 12/2011 | Schmidt-Thummes et al. |
| 2012/0028886 | A1 | | 2/2012 | McDaniel |
| 2012/0052316 | A1 | | 3/2012 | Evstatieva et al. |
| 2012/0083021 | A1 | | 4/2012 | Bohling et al. |
| 2012/0091217 | A1 | | 4/2012 | Greer, Jr. et al. |
| 2012/0121921 | A1 | | 5/2012 | Cosyns et al. |
| 2012/0129974 | A1 | | 5/2012 | Denotta et al. |
| 2012/0149811 | A1 | | 6/2012 | Chamberlain et al. |
| 2016/0032134 | A1 | | 2/2016 | Richardson |

FOREIGN PATENT DOCUMENTS

| | | |
|---|---|---|
| CN | 201160616 Y | 12/2008 |
| CN | 101815759 A | 8/2010 |
| DE | 2430494 A1 | 1/1976 |
| WO | 2004037039 A1 | 5/2004 |
| WO | 2013165826 A1 | 11/2013 |
| WO | 2013165828 A1 | 11/2013 |

OTHER PUBLICATIONS

International Search Report for PCT/US2013/038337.
International Search Report for PCT/US2013/038329.
Material Safety Data Sheet Attached. Canadian Colors and Chemicals Limited. Oct. 2, 2009 http://doc.ccc-group.com/msds/english/774504.pdf>.entire document.
JW Latex Consultants—Immediate Solutions to you Problems—Webpage http://latexconsultants.blogspot.in/2010/11/acrylic-emulsion-sealant.html.
http://www.frogtape.com/ is the Frog Tape website.
Hua, Hong, "Semi-Continuous Emulsion Copolymerization of Styrene-Butyl Acrylate With Methacrylic Acid: Structure-Property Relationship", Thesis, University of Ottawa, 2008, Ottawa, Ontario, Canada, all enclosed pages cited.
Richardson, John, http://www.perfectpaintlines.com/, Greystone Design, all enclosed pages cited.
Chinese Office Action dated Sep. 25, 2015, in corresponding Chinese Patent Application No. 201380034990.4, all enclosed pages cited.
Supplementary European Search Report dated Nov. 2, 2015, in corresponding European Patent Application No. 13785299.2, all enclosed pages cited.
Supplementary European Search Report dated Nov. 4, 2015, in corresponding European Patent Application No. 13784318.1, all enclosed pages cited.
Chinese Office Action dated Jan. 22, 2016, in corresponding Chinese Patent Application No. 201380035037.1, all enclosed pages cited.
Office Action for corresponding Mexican Application No. MX/a/2014/013066, dated Mar. 13, 2018, all enclosed pages cited.

* cited by examiner

APPLICATOR DEVICE FOR FILM FORMING FORMULATION FOR TEXTURED SURFACES

CROSS-REFERENCE TO RELATED APPLICATIONS

This application claims priority from U.S. provisional patent application No. 61/640,136, filed on Apr. 30, 2012, incorporated herein by reference in its entirety.

FIELD OF THE INVENTION

The present invention relates to an applicator device for a formulation for use on textured surfaces to obtain sharp paint lines on textured surfaces.

BACKGROUND OF THE INVENTION

Textured wall, floor or ceiling surfaces having three dimensional or otherwise textured surface effects present difficulties when applying masking tapes to such surfaces in preparation for painting. Masking tapes generally create gaps and an interrupted bond with the textured surface depending upon the irregularity of the surface. As a result, it is difficult to obtain sharp paint lines on the painted surfaces as the paint often bleeds under the masking tape when there are such gaps and irregularities.

At the present time, caulking the tape edges is the predominant method for obtaining sharp paint lines on textured surfaces. The use of caulk is typically at least a two-step process. The first step is applying the caulk to seal the tape edges and, after drying, the second step is painting the unmasked area. However, the method requires skilled labor which adds additional expense. There is also pre-paint and post-paint clean up due to the stickiness of caulk. This clean-up is on the painted surface, tools, and surrounding areas. The profile of the caulk is thick and causes a "step" or abrupt change in the thickness of the transition. This "step" is undesirable. The caulk often is never completely removed and remains sticky. Within a few months, the stickiness attracts and adheres dirt, making a dark, dirty line at the color transition point which is very undesirable.

Thus, there is a need for a method that reduces the cost of labor which is the most significant factor on a painting job. Additionally, there is a need for a method which eliminates or requires less clean-up and the use of skilled labor. Finally, there is a need for a method that improves the quality of the paint job by creating sharper paint lines on textured surfaces.

SUMMARY OF THE INVENTION

The present invention describes an applicator device for use in applying a film forming formulation of the present invention. The film forming formulation and variations thereof are suitable for use in painting textured surfaces such as textured walls, floors or ceilings. The present invention describes a method of using the film forming formulation in order to obtain sharp paint lines on the textured surfaces.

In an aspect of the present invention, the applicator device comprises an applicator head having an adaptor, and a supply reservoir having a neck for attachment to the adaptor of the applicator head. The applicator head comprises a brush comprised of aligned bristles, the bristles affixed in a brush retainer, a brush reservoir within the brush retainer for holding a film forming formulation within the applicator head, a flow orifice to provide flow of the film forming formulation to the brush reservoir, and an adaptor for attachment to a neck of the supply reservoir for supplying the film forming formulation.

In another aspect of the present invention, the applicator head comprises a brush comprised of aligned bristles with the bristles affixed in a brush retainer, a brush reservoir within the brush retainer for holding a film forming formulation within the applicator head, a flow orifice to provide flow of the film forming formulation to the brush reservoir, and an adaptor for attachment to a neck of a supply reservoir for supplying the film forming formulation.

In still yet another aspect of the present invention, a kit is provided comprised of an applicator device for applying a film forming formulation on a textured surface and a film forming formulation for use on a textured surface. The applicator device comprises an applicator head having a brush comprised of aligned bristles with the bristles affixed in a brush retainer, a brush reservoir within the brush retainer for holding a film forming formulation within the applicator head, a flow orifice to provide flow of the film forming formulation to the brush reservoir, and an adaptor for attachment to a neck of the supply reservoir for supplying the film forming formulation.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE DRAWINGS

DETAILED DESCRIPTION OF THE INVENTION

The following detailed description of the embodiment(s) is merely exemplary in nature and is in no way intended to limit the invention, its application, or uses.

The present invention describes a film forming formulation and variations thereof for use in painting textured surfaces such as textured walls, floors or ceilings. The film forming formulation is used with tape and applied to masked areas on textured surfaces.

The term "film forming" or "film former", as used herein refers to, a substance capable of forming a film upon application to a solid surface. The film forming formulation of the present invention is preferably a latex formulation. The film forming formulation of the present invention after application dries in air fairly quickly creating strong, clear and anti-glare film properties.

The film forming formulation of the present invention comprises a binder as a film forming component. Preferably, the binder is in the form of an emulsion. Components which are optionally present in the formulation include, but are not limited to, defoamer, a thickener, a dilutant, a matting agent, anti-settling agent, a biocide, a coalescent agent, or a combination thereof. The formulation also optionally comprises other additives such as UV stabilizers, dispersants, plasticizers and other stabilizers.

Suitable binders include, but are not limited to, acrylic polymer and copolymer, styrene-butadiene rubber (SBR), polyvinyl acetate (PVAc), and ethylene-vinyl acetate (EVA), among others. Examples of suitable acrylic polymers and copolymers are vinyl acrylic polymer, methyl methacrylate, and butyl acrylate, among others. Examples of suitable vinyl acrylics are vinyl acetate and butyl acrylate, among others.

Properties of a styrene acrylic emulsion suitable for use in accordance with the present invention are hydrophobic, with excellent water resistance, fast drying and excellent film formation. The styrene acrylic emulsion preferably comprises an acrylic polymer in a concentration of 50% to 52%, residual monomers in a concentration of less than 500 ppm, aqua ammonia in a concentration of 0% to 0.2%, and water in a concentration of 48% to 50%.

With regard to biocides, a biocide is a type of preservative that is added to avoid bacterial growth and/or mildew. Examples of commercially available biocides include, but are not limited to, Proxel GXL commercially available from Arch Chemicals, a Division of Lonza Corporation. In a preferred aspect of the present invention, a biocide is present in the formulation of the present invention to keep bacteria from growing in the film forming formulation and to extend the shelf life of the formulation. A suitable range for a biocide in the formulation of the present invention, if present in the formulation, is 0.04% to 0.25% by weight. More preferably, the biocide is present in a range of 0.07% to 0.10% by weight.

With regard to defoamers, a defoamer is used to eliminate or control foaming. For example, a defoamer is used to control the foam during manufacturing such as during blending and filling of the bottles and containers with the formulation. The defoamer also is useful to control the foam during application of the formulation for continuous film formation. Examples of commercially available defoamers include, but are not limited to, Drew Plus Y-250 and Drewplus L 140 foam control agents, commercially available from Ashland Chemicals. A suitable range for a defoamer in the formulation of the present invention, if present in the formulation, is 0.01% to 1% by weight.

Thickeners (also referred to as rheology modifiers) are suitable for use in the film forming formulation of the present invention. An alkali soluble, acrylic thickener having a pH in a range of about 2.8 to 3.0 is preferred. The thickener amount varies depending upon the desired viscosity for the application. A typical range for a thickener, if present, in the formulation of the present invention is about 0.05% to 2%. A thickener is optionally diluted with a dilutant such as water, as needed.

In addition to alkali soluble acrylic thickeners, associative thickeners are optionally added to improve rheological properties of the film forming formulation. Shear thinning behavior of the film forming formulation makes the latex formulation flow out smoothly when applied with a brush and/or applicator brush assembly but not drip excessively. The thickener impacts how thick the film forming formulation is applied and how well it flows under a high shear rate. The film forming formulation of the present invention preferably comprises one or more thickeners. Examples include, but are not limited to, Acrysol ASE 95NP is a non-associative alkali soluble, acrylic thickener from Dow Chemical Company; Borchi Gel 75N is a polyurethane based, non-ionic liquid associative thickener from OMG Americas Inc. that acts as a flow promoter in emulsion paints; Aeorodisp W 7520 is low viscosity water based dispersion of fumed silica, with a slightly alkaline pH from Evonik Industries that reduces anti-settling and improves leveling and matting agent efficiency. The film forming formulation preferably comprises between 0.05% and 0.09% by weight of a non-ionic liquid associative thickener.

With regard to coalescent agents, a coalescent agent is used to lower the minimum film forming (MFFM) temperature. Examples of commercially available coalescent agents include, but are not limited to, Texanol (ester alcohol) commercially available from Eastman.

With regard to matting agents, a matting agent is used to reduce gloss. Examples of commercially available matting agents include, but are not limited to, ACEMATT OK 412 commercially available from Evonik Industries. Matting agents that are organically surface treated and are easily dispersible with desirable suspension behavior are preferred.

The film forming formulation of the present invention without a thickener present in the formulation typically has a viscosity in a range of about 100 to 1200 cps (centipoise), preferably 200 to 600 cps. This viscosity range is for measurements taken at room temperature and with Brookfield RVT Spindle#2 at 50 rpm (revolutions per minute). When a thickener is present in the formulation, the film forming formulation of the present invention typically has a viscosity in a range of about 1500 cps to 2500 cps. This viscosity range is for measurements taken at a temperature of 73.4±3.6° F. with Brookfield RVT Spindle#4 at 50 rpm (revolutions per minute)

The film forming formulation of the present invention has a glass transition temperature (Tg) of at least 10 degrees Celsius. A significant advantage of the film forming formulation having a glass transition temperature in this range is that it forms a film that is both strong enough to withstand the mechanical forces in the application such as the relative movement between the surfaces, impact/abrasion of the paint application methods (rubbing, dabbing, poking, etc.). But more significantly is that when the tape is removed, the film has a very clean fracture, making the paint line very sharp and clean. This is a significant improvement as compared to caulk or other known tape sealants having lower glass transition temperatures such as the tape sealant described in US Patent Pub. No. 2009/0119175A1. Caulk, for example, is highly rubbery and sometimes pulls the paint resulting in damage to the textured surface, an irregular line, or a combination thereof. In the lower viscosity formulation of the present invention, the profile of the film formed by the formulation of the present invention is very low or thin as compared to caulk or other known tape sealants such as described in US Patent Pub. No. 2009/0119175A1.

Another significant improvement is that the film resulting from application of the film forming formulation of the present invention dries to the touch quickly. Additionally, the film of the present invention is such that it does not require any clean up or post touch up operations.

Color Shift

Another variation of the film forming formulation of the present invention is where the film forming formulation comprises a color shift indicator or an acid-base (pH) indicator. Color shift in this context, refers to a change from a defined color (i.e. contrasting color to show presence) to no longer visible.

For example, thymolphthalein stock solution may be added to the film forming formulation to change from blue to clear as the formulation dries. The transition range of thymolphthalein is in a pH range of about 9.3 to 10.5. Another example of a potential color shift indicator is phenolphthalein which has a transition in a pH range of about 8.2 to 10. Its color is pink above 10 but gets clear or colorless at 8.2 or below. The above examples are non-exclusive as other chemicals or chemical compositions are optionally present in the formulation as an indicator of the degree of wetness or dryness of the applied formulation.

When applying a film forming formulation having a color shift or pH indicator, the film forming formulation goes on the surface with a contrasting color to show what has been applied to the surface and then disappears as it dries. The contrasting color is visible for a period of time such that a person applying the formulation achieves the desired coverage, but subsequently the contrasting color disappears.

The function of the color shift is achievable in many ways, including but not limited to, by controlling reactivity. In one aspect of the invention, a material is selected such that formulation is air reactive whereby the material reacts with normal air. It reacts, for example, either due to exposure to oxygen ($O_2$) or carbon dioxide ($CO_2$). In another aspect of the invention, a material is present in the formulation to be pH reactive such that the material reacts with a shift in pH. For example, a polarized pH material such as ammonia is present that evaporates and the reduction in the active material via evaporation causes a pH shift driving the color change or shift.

Another method of achieving a color shift in accordance with the present invention is applying the formulation of the present invention having the shift change material and then applying a second material that causes the color to permanently shift. This reaction is immediate with the application of the second material.

The color shift material is selected based upon reaction time. The formulation is such that it could take anywhere from 10 minutes to up to one hour (or longer). A shorter time is more desirable, such as 10 to 15 minutes and then the color shifts. There is not a need for the shift to be complete by the time painting starts but rather just for a reasonable time so the user is satisfied that the job is complete.

Method

The present invention sets forth a method of using the film forming formulation in combination with a tape to mask areas on textured surfaces. The method of the present invention generally comprises applying tape to the area or surface to be masked (typically with finger pressure especially at the tape edges) and then applying the film forming formulation at the intersection of the tape and surface referred to herein as a tape and surface junction. The application of the film forming formulation results in a strong, clear and anti-glare film to be subsequently painted. The film forming formulation is preferably applied to the tape and surface junction in a width of about ¾ to one inch with brush strokes to sweep the material towards the tape for maximum desirable results. The method further comprises applying the paint. Note that paint is applied to the unmasked areas but brush strokes may also paint a portion or portions of the tape. When paint touches the tape and surface junction, the film created at the first step shields any bleeding occurring under the masking tape. The clear film created by the film forming formulation is scored at the edges of the tape during the removal creating sharp paint lines on textured surfaces.

Pressing of the tape into place along the surface without the use of the film forming formulation of the present invention to reduce the gap between the tape edges and the textured surface is very difficult to do consistently. The film forming formulation ensures that the film former protects the tape and surface junction to create sharp paint lines.

Any tape including, but not limited to, traditional masking tape or painting tape is suitable for use in conjunction with the film forming formulation of the present invention. Although a traditional masking tape or painting tape may be used in accordance with the present invention, the film forming formulation of the present invention is also suitable for use in conjunction with a tape having been treated, preferably on the edges, with a superabsorbent polymer. The superabsorbent polymer absorbs paint to prevent paint bleeding. The superabsorbent polymer is capable of absorbing and retaining water many times its dry weight. A tape having such properties creates a barrier instantly on smooth surfaces but also creates a barrier on textured surfaces when used in conjunction with the film forming formulation of the present invention. An example of such a tape is FROG-TAPE™ painting tape, commercially available from Shurtech Brands, LLC.

Applicator Device

As another aspect of the present invention, an applicator device(s) is described for applying the film forming formulation. The film forming formulation is preferably applied with a device such as a brush, a pen with applicator such as a highlighter (with or without a hard tip), a roll-on applicator, a squeezable tube or bottle with foam applicator, or other device having the ability to dispense the film forming formulation in a relatively uniform manner.

In one aspect of the application, the applicator has a tip having a surface for contacting the tape and the wall and for pushing the film forming formulation into the depressions of a textured surface. The engineered tip has a specified resilience (stiffness and softness), and reasonable hand holding shape (interface with the user) that provides comfortable use, effective operation (deposit of material and pushing the tape down), and efficiency (speed, material deposit, etc.).

The applicator for applying the film forming formulation of the present invention has the following possible configurations.

In one aspect of the present invention, the applicator is a bottle or reservoir having a shape suitable for holding of the film forming formulation for storage and use in application. It is shaped to allow the bottle to operate inverted with the applicator on the lower side to facilitate flow through the applicator head. Other optional features of the applicator of the present invention include, but are not limited to, angled head, flow controlled depending upon the material of the applicator interface (such as brush, sponge, felt, etc.), operating valve (on/off valve) actuated by an operating lever either hand actuated or press activated (to the surface) in possible conjunction with orifices of any type for restriction or control of the flow, and sealing cap. Examples of applicator interfaces include, but are not limited to, a brush, pen, sponge, felt, and roller.

Features of a suitable brush include, but are not limited to, bristle stiffness and length to allow pressure to press the tape to the surface but not to damage the film during the formation time. The brush is made of synthetic or natural materials.

In a preferred aspect of the present invention, the brush is comprised of a synthetic polymer material, treated natural materials, or other materials. Examples of suitable materials include, but are not limited to, nylon, polyester, or a combination thereof. Polyesters include, but are not limited to, polyethylene terephthalate (PET) and polybutylene terephthalate (PBT).

With regard to the brush configuration, the brush is preferably circular or semi-circular with one or more rows of bristles. The diameter (cross applicator distance) is to allow for effective coverage of the tape to wall surface area, efficiency by reduced material or controlled material application, and ease of use.

Features of a suitable sponge include, but are not limited to, sufficient stiffness to press the tape into place but with porosity to allow flow of the formulation through the sponge to the surface. The sponge preferably is engineered to reduce undesired foaming of the formulation.

Features of a suitable felt include, but are not limited to, a flat shape (such as rounded or squared) of varying size with coverage area sufficient to handle the tape and wall junction.

Features of a suitable roller include, but are not limited to, a selected shape, size, and material suitable for the application. A softer roller is preferred to allow for flex and distortion at surface contact along with shape (such as a ball or roller, etc.) that covers the surface in a sufficient width and contact area to allow for single or few strokes.

Features of a suitable applicator, include but are not limited to, an applicator that is flow controlled over the surface of steel, aluminum, or other metallic applicator and that is shaped to allow the application of the liquid to the surface. A metal applicator tip is desirable for tape materials that are flexible or require pressing onto the surface. The metal applicator can be ported to facilitate flow to surface. Similar to a metal applicator, a plastic applicator allows for more complex shapes or porting.

An applicator of the present invention has valve and flow control attributes. An applicator of the present invention preferably has the following flow control attributes alone or in combination: operating valve, orifice, applicator attachment, squeezable bottle or reservoir. The applicator device 100 of the present invention optionally comprises a siphon tube (not shown). A siphon tube fits into the flow orifice (shown in FIG. 3) allowing pressure to be exerted on the reservoir to allow pumping when the applicator is at the most top vertical position. The siphon tube allows use of the applicator in an inverted or overhead position, applicator attachment, squeezable bottle or container.

An example of a main or primary operating valve is a plastic push rod that operates in the cap or a rotating type valve. The push rod type valve is operable by pressing of a lever that is protruding from the valve assembly within the area of the applicator (i.e. brush bristles). The rotating type valve rotates to control function of flow either through the siphon tube in the supply reservoir or through an alternate feed through the applicator head location. This allows for feeding in vertical or inverted positions for overhead, base board or wall positions as desired. The liquid formulation flows when the valve is operated from the bottle to the wall or other surface.

There is a spectrum of potential commercially available orifices or molded in configuration orifices for use in the applicator to control the flow of the formulation. For example, the material of the orifice can be as low complexity as a plastic sheet with holes punched in it to control the flow. In the case of a molded in orifice, a precision pin or tooling is optionally used during the manufacturing or molding process to ensure size and placement of the orifice in the applicator device for control and placement of flow from the reservoir through the applicator head to the wall or other surface.

A flow sponge is an option for use as material inside of the lid of the applicator top. The sponge is pushed into the lid where the applicator is installed, then screwed on or otherwise attached to the bottle. With the tight fit of the flow sponge to the inside of the lid, the maximum flow through the applicator head and/or valve (for shutting off and turning on flow) is controlled by the flow sponge. A flow sponge is a sponge, typically comprised of synthetic material that does not absorb material within its material. The flow sponge is an almost flexible plastic structure with a defined porosity that controls the flow of liquid through it, as to impart the control of flow.

The bottle is preferably made of plastic in a firm, but squeezable structure. This allows for firm gripping but also allows added material to flow with a quick squeeze. The bottle preferably has a large enough opening to allow for insertion of a paint brush to allow for dipping inside and use of the brush in certain instances (see below—ceiling approach). For example, if the material were to be used on a ceiling, then the larger opening would be utilized. A user potentially dips a paint brush, felt brush, or sponge applicator brush into the liquid formulation and then applies a coat to the ceiling.

Among other features of an applicator for use with the formulation of the present invention are the opening of the bottle being angled at 45° or other suitable angle for attachment of the applicator head, a bottle having a shape and size to allow for easy, comfortable gripping in multiple orientations and an optionally textured bottle to aid in gripping, an angled bottle neck for use when the bottle is upside-down.

The applicator is engineered to address usage rate versus surface character.

Coverage Profile Examples

| Example Surface | Surface Texture | | | Comments |
|---|---|---|---|---|
| | Light | Medium | Heavy | |
| Knock-Down | Single-Lite Coat | Medium to Heavy Coat | Probable Second Coat | Frequency and surface height variations are the primary influence of material usage. |
| Orange Peel | Single-Lite Coat | Single Light to Medium Coat | Potential Second Coat | The amount and viscosity of the material applied includes the surface character and subsequent material usage. |
| Hawk & Trowel | Single-Lite Coat | Single Light to Medium Coat | Medium Coat | Amount of material used and surface height variations influence the material usage. |
| Pop-Corn | Single-Lite Coat | Single Light to Medium Coat | Medium to Heavy Coat | The amount and viscosity of the material applied includes the surface character and subsequent material usage. |

-continued

| Example | Surface Texture | | | |
|---|---|---|---|---|
| Surface | Light | Medium | Heavy | Comments |
| Stucco | Single-Lite Coat | Single Light to Medium Coat | Potential Second Coat | Frequency and surface height variations are the primary influence of material usage. |

There are other surfaces fabricated in slightly different ways. The consideration is the three dimensional profile requiring sealing, frequency of these profiles, and the individual's technique. All surfaces have the same or similar characteristics that can be discussed in the same manner as above for relevance for approach, material usage, and other factors. The aspect of material usage is in the complete coverage and film's integrity. It is a robust material not requiring precision, training, or difficult approach. Just the consistency of a good application with sufficient material applied.

On conventional surfaces, typically called medium knock-down or orange peel, there is an application rate of about 1 oz. per 10 yards along edge of tape surface. It is more or less, depending upon the surface character and the manner in which the formulation is applied such as evenly, with sufficient coverage. On lighter surfaces, there is less material used. On severe surfaces, where the surface has greater level and frequency of irregularity, the consumption potentially increases by approximately 60% in using it on a second coat.

Figure 1:
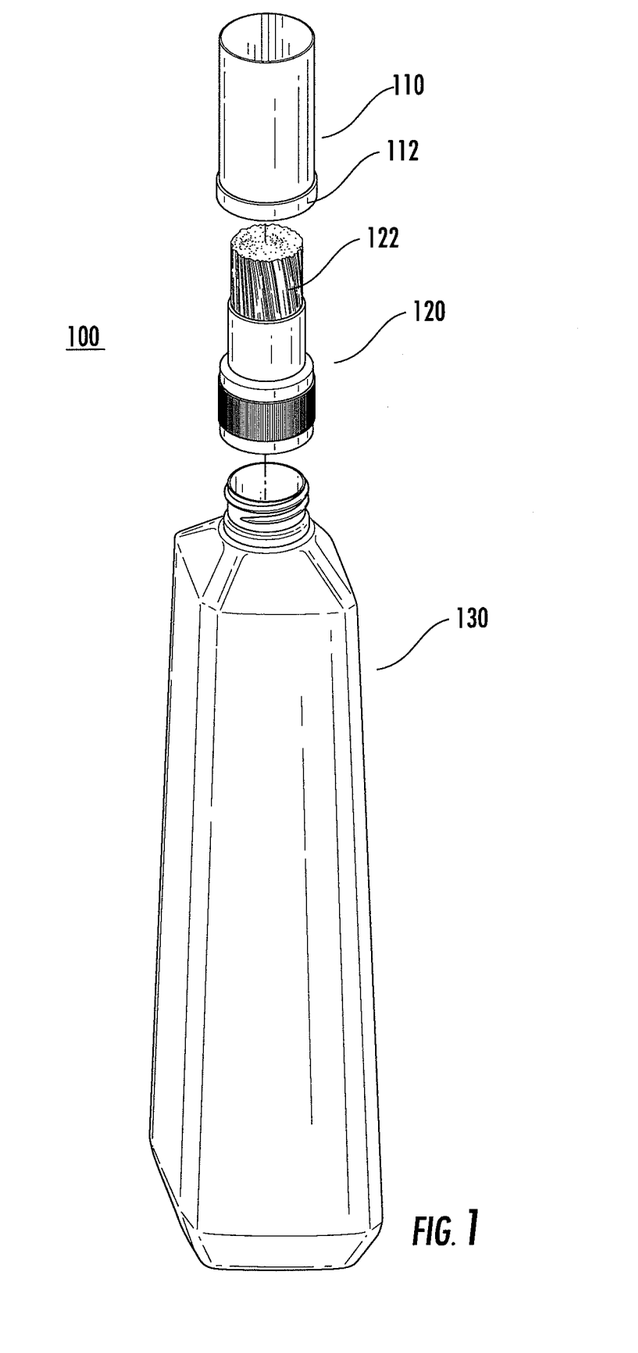
FIG. 1 is an exploded perspective view of an applicator device in accordance with aspects of the present invention.

Referring to the figures, FIG. 1 is an exploded perspective view of an applicator device particularly suitable for use with the film forming formulation on textured surfaces and in accordance with aspects of the present invention. Applicator device 100, shown in FIG. 1, comprises a protective cap 110, applicator head 120, and bottle or supply reservoir 130.

Protective cap 110 serves numerous functions. Protective cap 110 keeps the brush 122 of applicator head 120 clean from particulate matter prior, during, and after use. Protective cap 110 seals the applicator device 100 to prevent airflow in order to keep the brush 122 from prematurely drying out when saturated with film forming formulation. Additionally, protective cap 110 protects the applicator device 100 from physical damage. A feature of the protective cap 110 is a rim 112 that forms a seal with the applicator head 120 of the applicator device 100 at the protective cap seal edge 126 (shown in FIG. 6). Preferably the protective cap 110 has a height of from about 28 mm to 55 mm and a width of from about 19 mm to 29 mm.

Also shown in FIG. 1 is supply reservoir 130. A primary function of supply reservoir 130 is to hold a film forming solution in accordance with aspects of the present invention. Among other purposes and functions of supply reservoir 130 are flow control and ease of handling and use. With regard to flow control, supply reservoir 130 facilitates flow control of film forming solution by providing wall stiffness and wall shape. Wall stiffness is controlled primarily by selection of wall material, wall density, and wall thickness. Supply reservoir 130 is comprised of a polymeric material that is deformable upon pressure, initiates flow but also is of sufficient stiffness to prevent collapsing or excessive compression. Examples of suitable polymeric materials for supply reservoir 130 include, but are not limited to, polyethylene (high density and low density), polyethylene terephthalate, polybutylene terphthalate, and other polymers. Wall shape is an important feature of supply reservoir 130. The rectangular, flat-like wall shape of supply reservoir 130 allows for ease of holding and ease of squeezing yet provides control of the film forming solution. With regard to handling and use, applicator device 100 is suitable for use over extensive periods of time. Supply reservoir 130 is ergonomically designed. The shape resembles that of a tool versus a typical bottle.

Figure 2:
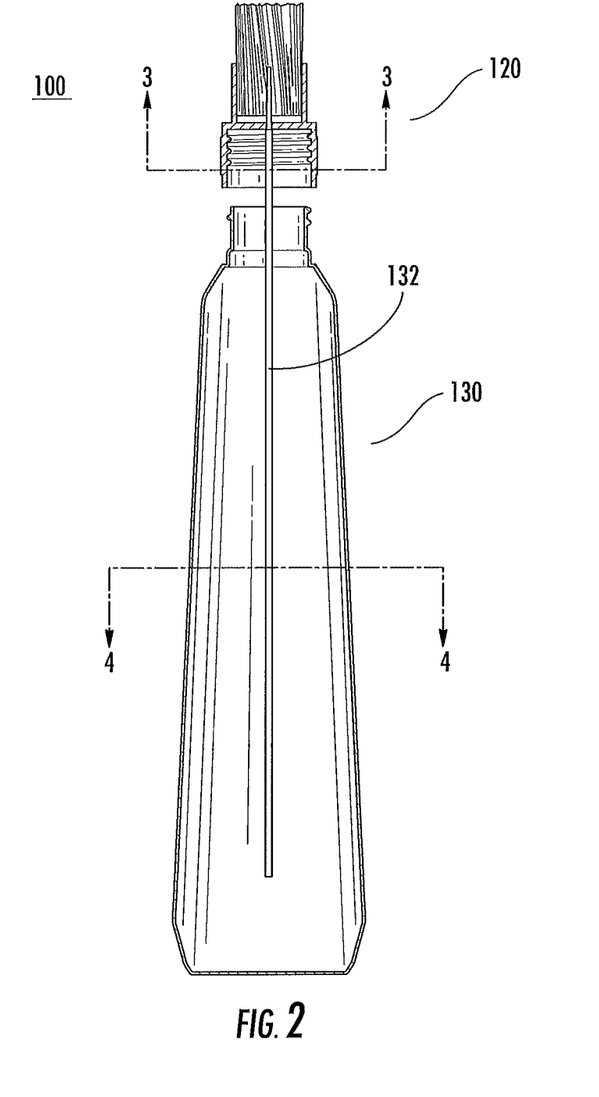
FIG. 2 is a cross-sectional side view of the applicator device of the present invention in accordance with aspects of the present invention.
Figure 3:
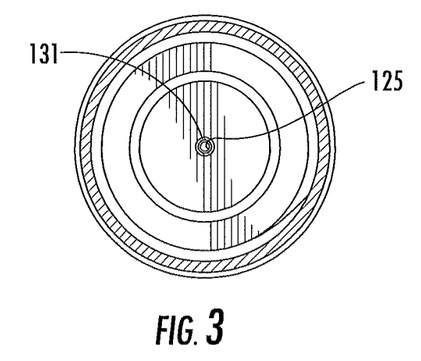
FIG. 3 is a horizontal cross-sectional view of the applicator head of the applicator device of FIG. 1.
Figure 4:
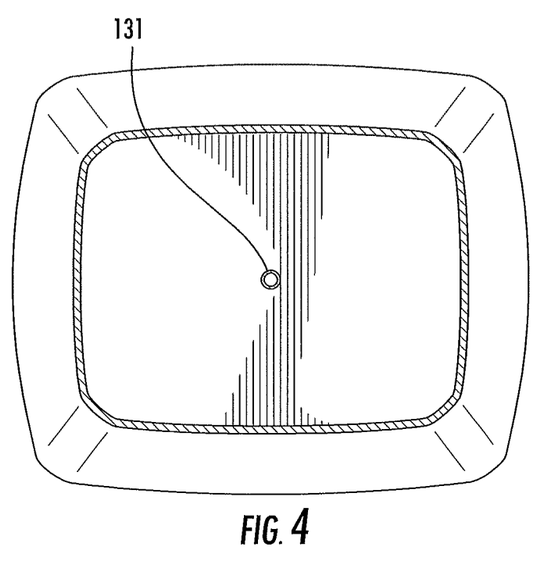
FIG. 4 is a horizontal cross-sectional view in the direction toward the bottom of the reservoir of the applicator device of FIG. 1.

FIG. 2 is a cross-sectional side view of the applicator device 100 of the present invention in accordance with aspects of the present invention. FIG. 2 illustrates locations of cross-sectional views 3-3 and 4-4 illustrated in FIGS. 3 and 4, respectively. FIG. 3 is a horizontal cross-sectional view of the applicator head 120 of the applicator device 100 of FIG. 1. Flow orifice 125 of applicator head 120 is shown in FIG. 3. FIG. 4 is a horizontal cross-sectional view in the direction of the bottom of supply reservoir 130 of applicator device 100 of FIG. 1.

The applicator device 100 of the present invention optionally comprises a siphon tube 132. The siphon tube 132 fits into the flow orifice 125 allowing pressure to be exerted on the supply reservoir to allow pumping when the applicator is at the most top vertical position. The siphon tube 132 allows use of the applicator in an inverted or overhead position.

Figure 5:
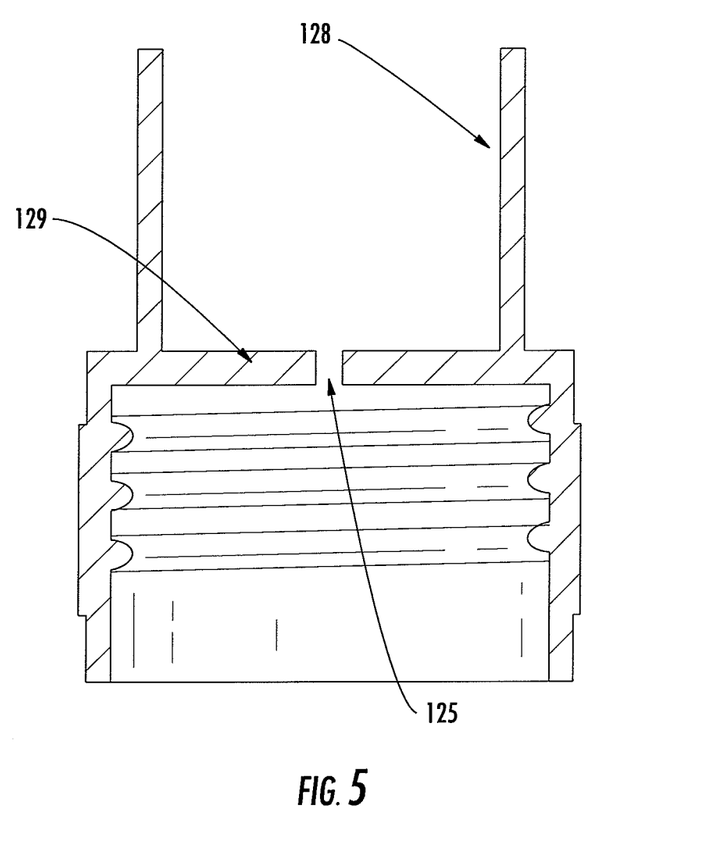
FIG. 5 is a vertical cross-sectional view of the applicator head (without bristles inserted) in accordance with aspects of the present invention.

FIG. 5 is a vertical cross-sectional view of the applicator head 120 (without bristles inserted) in accordance with aspects of the present invention. FIG. 5 illustrates brush retainer 128 that forms a tube and brush holder base 129. Brush retainer 128 holds brush 122 comprised of bristles in vertical alignment. Brush holder base 129 supports brush 122. Brush retainer 128 is preferably molded of a polymeric material.

Figure 6:
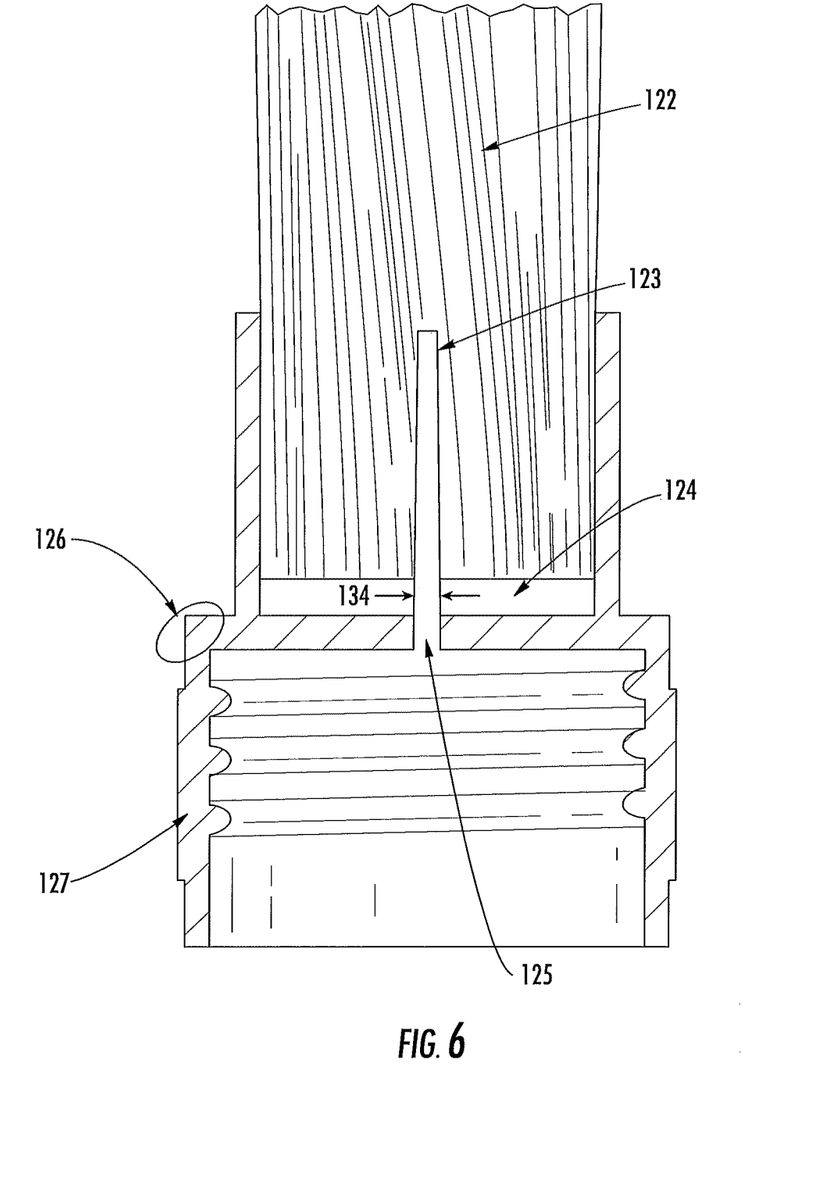
FIG. 6 is a vertical cross-sectional view of the applicator head (with bristles inserted) in accordance with aspects of the present invention.

FIG. 6 is a vertical cross-sectional view of applicator head 120 (with bristles inserted) in accordance with aspects of the present invention. Referring to FIG. 6, the bristles of the brush 122 are aligned and are molded or glued at room temperature to form the bristle retainer 124. Examples of suitable epoxy adhesives include, but are not limited to, polyurethane (one part or two, moisture cured polyurethane/urethane or UV cured), reactive (polyester, polyols, acrylic resins), and polyvinyl acetate (PVA). Examples of suitable hot melts include, but are not limited to, ethylene vinyl acetate (EVA) and other thermoplastics. In one aspect of the present invention, depending upon the manufacturing process, an adhesive bath is provided such that the bristles are fixed or held and then dipped into the bath. The bristles absorb the adhesive and then cure. The bath, for example, is in a stainless steel or release coated container.

The bristles of brush 122 are also aligned with a pin (not shown). The pin is inserted-in a hole in bristle retainer 124. The pin ensures that there is a hole 134 through the bristle retainer 124 in direct alignment with flow orifice 125. The flow orifice 125 is molded into or subsequently drilled in the bristle retainer 124 for precision and control. Thus, flow orifice 125 is in the bristle retainer 124 or in the brush holder base 129 or part of adaptor 127 depending upon the size and method of manufacture. The flow orifice 125 has a typical size in a range of from about 0.5 mm to 2.5 mm. The pin holds the bristles of brush 122 in alignment and out of the brush reservoir 123. The brush reservoir 123 is an open cavity formed to allow accumulation of film forming solution for flow to the tip of the brush 122. The brush reservoir 123 aids in even and consistent flow throughout the brush 122.

For ease of assembly, the assembled brush (bristles glued or molded into the bristle retainer 124) is inserted into the brush retainer 128 on adaptor 127. The outside diameter of bristle retainer 124 fits into the inner diameter of adaptor 127. Bristle retainer 124 is arranged on brush holder base 129 which is a flat area.

In an alternate method of manufacture, a one shot molded assembly process is potentiallly used to form the brush.

As shown in FIG. 6, the applicator head 120 comprises a brush 122 comprised of bristles, brush reservoir 123, bristle retainer 124, brush retainer 128, flow orifice 125, protective cap seal edge 126, and adaptor 127. Adaptor 127 is made to fit a given supply reservoir such as a standard 24-410 (SPI-Standard neck).

With regard to the brush bristles, a bristle has a diameter in a range of about 0.05 to 0.125 mm. The bristles are of a sufficient count to fill the brush retainer 128 depending upon the overall diameter of the brush assembly. The bristles of the brush 122 are comprised of synthetic polymer materials, treated natural materials, or other types of materials. Examples of suitable polymer and other materials include, but are not limited to, nylon, polybutylene terephthalate (PBT), polyethylene, polypropylene, polystyrene, carbon fiber, polyvinyl chloride (PVC), polyether ether ketone (PEEK), polyesters such as polyethylene terephthalate (PET), and a combination thereof. The diameter and material of the bristles are selected to allow a flow rate along the surface and between the bristles to where flow predominantly is from the tip of the brush and not the sides of the brush. This is engineered or controlled to the balance of viscosity of the film forming solution, size of the flow orifice, of the brush reservoir, the diameter and material of the bristles.

Figure 7A:
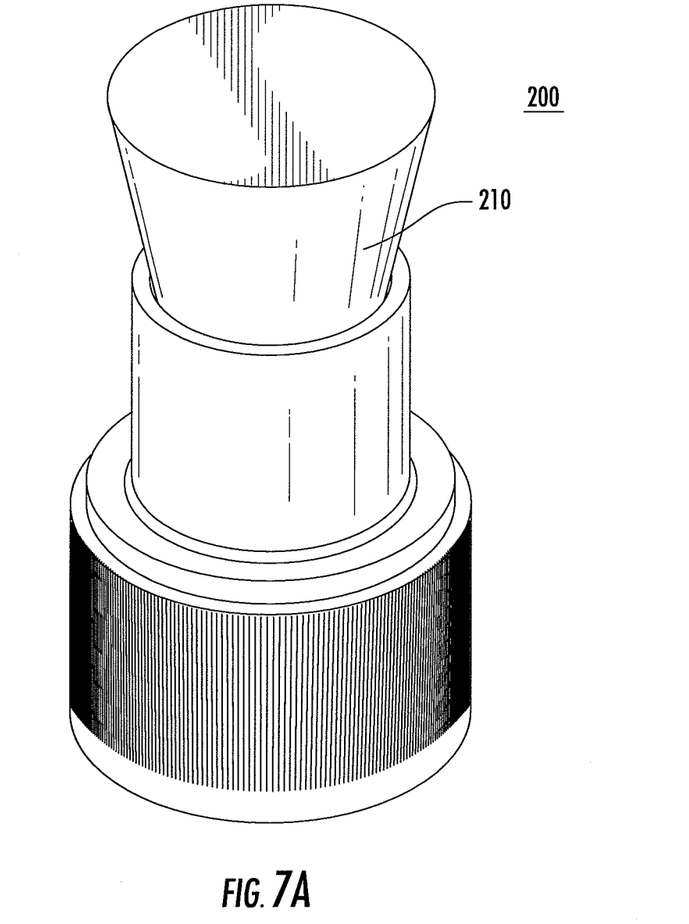
FIG. 7A is a perspective view of the applicator device having contoured bristles in accordance with aspects of the present invention.
Figure 7B:
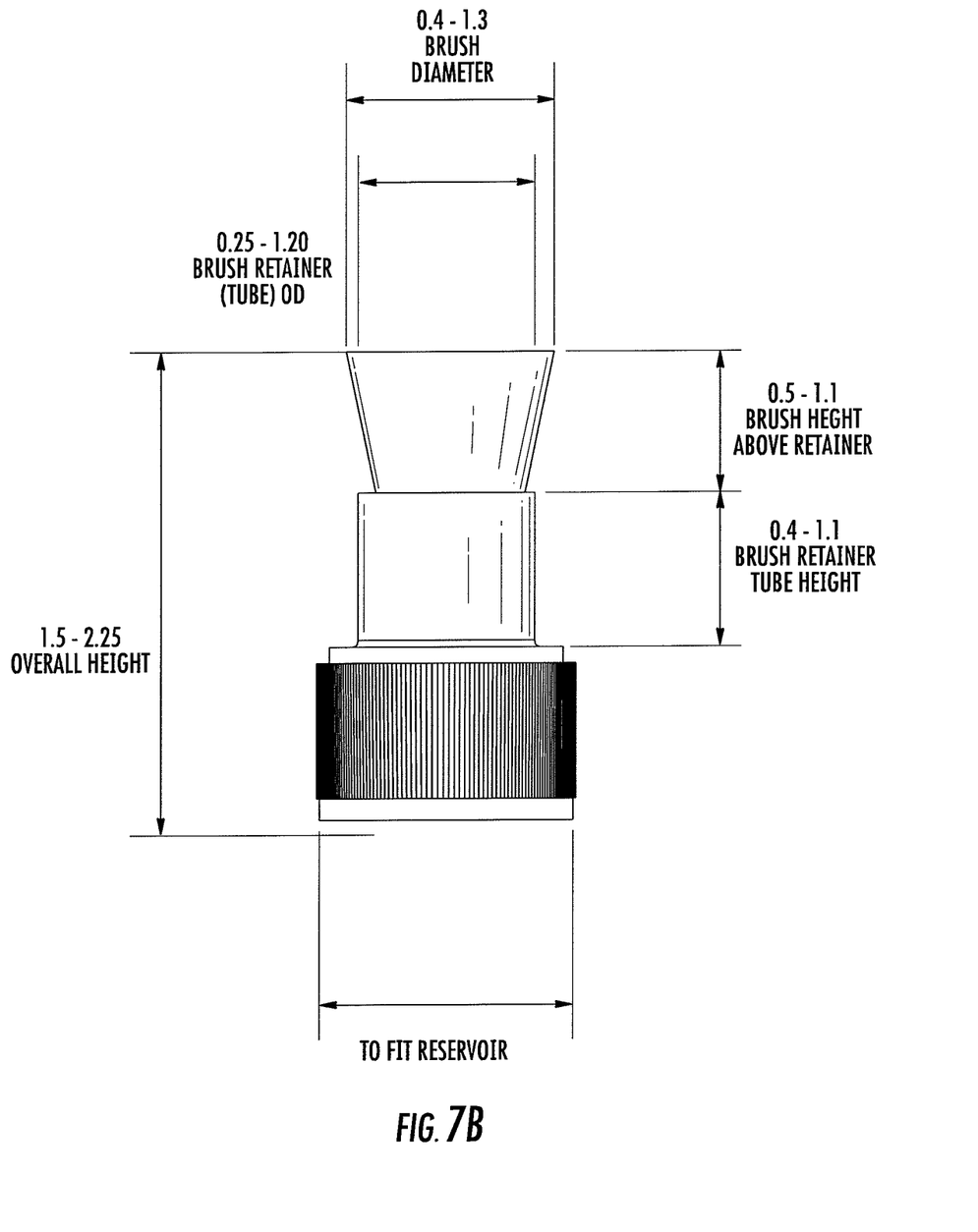
FIG. 7B is side profile view of the applicator head of FIG. 7A.

FIG. 7A is a perspective view of the applicator device 200 having contoured bristles 210 in accordance with aspects of the present invention. FIG. 7B is side profile view of the applicator head 200 of FIG. 7A. As illustrated in FIG. 7B, the brush diameter is in a range of about 0.4 inches to 1.3 inches. The brush retainer 128 has an outer diameter in a range of about 0.25 inches to 1.20 inches. The brush height above the brush retainer 128 is in a range of about 0.5 inches to 1.1 inches. The applicator head has an overall height of about 1.5 inches to 2.25 inches. The brush retainer 128 height is in a range of about 0.4 inches to 1.1 inches.

EXAMPLES

The following film forming formulations in Table 1 were prepared and tested.

TABLE 1

| Raw Materials: | Formula 1 | Formula 2 | Formula 3 | Formula 4 | Formula 5 | Formula 6 |
|---|---|---|---|---|---|---|
| Rhoplex P-376 (grams) | 300 | 297.5 | 194 | 199.3 | 0 | 300 |
| Acronal S 504 na (grams) | 0 | 0 | 0 | 0 | 60 | 0 |
| Acronal S 728 (grams) | 0 | 0 | 0 | 0 | 40 | 0 |
| Ace Matt TS 100 (grams) | 0 | 1.7 | 1 | 0 | 0 | 0 |
| Ace Matt OK 412 (grams) | 0 | 0 | 0 | 2 | 2 | 1.3 |
| Aerodisp 7520 (grams) | 0 | 0 | 0 | 0 | 0 | 2.2 |
| Drew Plus Y-250 (grams) | 0 | 0 | 0 | 0 | 0 | 0.25 |
| Drew Plus L 140 (grams) | 0 | 0 | 0 | 0 | 0 | 0.15 |
| Water (grams) | 0 | 0 | 8 | 0 | 0 | 20 (This amount was preblended* with the Borchi Gel in a 10 to 1 ratio) |
| Borchi Gel L 75N (grams) | 0 | 0 | 0 | 0 | 0 | 0.2 |
| Water (grams) | 0 | 0 | 0 | 0 | 0 | 0.25 (This amount was preblended* with the Acrysol in a 1 to 1 ratio) |
| Acrysol ASE 95 (grams) | 0 | 0 | 0 | 0 | 0 | 0.25 |
| Proxel GXL (grams) | 0 | 0 | 0 | 0 | 0 | 0.25 |
| Viscosity - Brookfield RVT | 320 cps (spindle #2 at 50 rpm and room temp. 73.4 ± 3.6° F.) | 224 cps (spindle #2 at 50 rpm and room temp. 73.4 ± 3.6° F.) | 240 cps (spindle #2 at 50 rpm and room temp. 73.4 ± 3.6° F.) | 352 cps (spindle #2 at 50 rpm and room temp. 73.4 ± 3.6° F.) | 260 cps (spindle #2 at 50 rpm and room temp. 73.4 ± 3.6° F.) | 2,000 cps (spindle #4 at 50 rpm and room temp. 73.4 ± 3.6° F.) |
| Appearance | Glossy | Semi-glossy | Semi-glossy | Semi-glossy | Semi-glossy | Semi-glossy |

*Pre-blending the thickener with water eliminated shocking of the latex during compounding The following raw materials were used as binders:

RHOPLEX P-376 is a styrene acrylic emulsion commercially available from Dow Chemical Company. (Properties: ionic nature: anionic; solids %: 50; pH: 9.4; viscosity (cps): 200; glass transition temperature, Tg: +19° C.; density at 25° C. (lb/US gallon): 8.7; specific gravity (g/ml): 1.04)

ACRONAL S 504 na is an aqueous dispersion of an n-butyl acrylate-acrylonitrile-styrene copolymer commercially available from BASF (Properties: pH: 7-8, Tg: +4° C., viscosity: 300 cps)

ACRONAL S 728 is an aqueous dispersion of a styrene/n-butyl acrylate copolymer commercially available from BASF (Properties: pH: 7, Tg: +23° C., viscosity: 200 cps)

The following raw materials were used as matting agents:

ACEMATT OK 412 is a precipitated silica all-purpose matting agent commercially available from Evonik Industries. It is an organically surface treated, easily dispersible matting agent with outstanding suspension behavior, especially suitable for use in clear coats.

ACEMATT TS 100 is a thermal, untreated silica with excellent matting efficiency and transparency.

Comparative Example

The tape sealant of U.S. Patent Pub. No. 2009/0119175A1 ("tape sealant") was tested as compared to the following film forming formulation(s) (FFF) of the present invention, including Formulation 1, Formulation 4 and Formulation 5. The following observations were made between the Formulations versus tape sealant:

Dry time (FFF v. Tape Sealant): about 10 to 15 minutes for the film forming formulation versus about 30 to 60 minutes for tape seal Viscosity: Ranging from 400-600 cps (measured at a temperature 73.4±3.6° F. using a Brookfield RVT viscometer with spindle #2 at 50 rpm) of FFF versus 2700 cps (measured at a temperature 73.4±3.6° F. using a Brookfield RVT viscometer with spindle #4 at 50 rpm) of the tape sealant Flow referred to two different areas with regard to flow:

Application Flow: with the lower viscosity the material flows easily from the bottle, can be controlled easier (rate, on, off, etc.).

Surface Flow: on the surface (tape and wall) the material flows to an even coat vs. blotchy or uneven coverage. This improves performance, usage, smoothness of final surface, etc.

Improved Finish: The film forming formulation of the present invention has an improved finish for two reasons—improved matte appearance (low light reflectance) and surface flow rate (no bumps/unevenness).

Coverage: With the improved flow there were no gaps or holes in the coverage. This prevented leaks resulting in paint bleed.

Reduced Material Usage: with the improved flow rate and control, get more coverage out of a given amount of solution.

Fast Form Film (vs. shrinking filler): The material formed a film over the tape to wall interface v. filling a gap with the material. The FFF did not have appreciable shrinkage (as with most slow dry/cure materials) so there was no leakage due to gaps caused by shrinkage.

The film forming formulation(s) of the present invention behaved as a film v. a filler. This provided several advantages set forth as follows:

Improved seal: the bridging of the interface versus filling the holes allowed the material to a function over a wider range of gaps/textures.

Clean Fracture: The FFF material cleanly separated at the tape/wall interface giving a consistent, ridge free line versus filler type solutions.

Engineered Invisibility: In FFF, the light reflectance and transparency was engineered into the film to yield an invisible layer in order to avoid any clean up, touch up, or visual issues.

TABLE

Application/Solution Analysis

| | Film Forming Formulations of Present Invention | Tape Sealant | Caulk |
|---|---|---|---|
| Application Method | Used the simple applicator to put the film former on the tape/wall interface point with thorough consistent coverage. | Used a paint brush to apply the solution to the tape/wall interface point. | Carefully applied a caulk bead to the tape/wall joint, wiping off excess. |
| Application Ease | Considered very easy and rapid. | Considered easy but does require careful "painting" of the thick liquid to a smooth surface. | Considered medium difficulty and better done by a skilled craftsman to prevent leaks. |
| Paint step | None | Material was filler, so remnant material left a step or edge after tape removal. | Caulk left a "line" of caulk that both was visible and potentially attracted dirt. |
| Finish Issues | None | Shiny finish potentially showed on flat paint surfaces. | Bead of caulk attracted dirt over period of time. |
| Application Speed | Rapid application and rapid dry (10 minutes). Was ready to paint immediately. | Took up to an hour to dry. | Was ready to paint within 15 minutes, but remained sticky. |
| Usage Rate | About 1 oz./10 Yd. of single edge tape treatment. Heavy texture could require 1.5 oz./10 Yd. | About 1 oz./10 Yd. along edge of tape but heavy texture can be 2.0 oz./10 Yd. along edge of tape. | Usually a tube of caulk can handle the job. |

FTIR scan comparison: FTIR scans indicated that FFF had more styrene (aromatic content) as compared to tape sealant which had less.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. An applicator device comprising:
   an applicator head having an adaptor and a brush comprised of bristles with the bristles affixed in a brush retainer with a brush diameter and a brush height above the brush retainer, a supply reservoir having a neck for attachment to the adaptor of the applicator head, the supply reservoir containing a film forming formulation comprised of a binder selected from the group consisting of acrylic, styrene-butadiene rubber (SBR), polyvinyl acetate (PVAc), ethylene-vinyl acetate (EVA), and a combination thereof, and wherein the brush diameter is in a range of about 0.4 inches to 1.3 inches and the brush height above the brush retainer is in a range of about 0.5 inches to 1.1 inches.

2. The device according to claim 1, further comprising a protective cap for attachment to the applicator head.

3. The device according to claim 1, wherein the supply reservoir is comprised of a polymer material selected from the group consisting of polyethylene, polyethylene terephthalate and polybutylene terephthalate, and combinations thereof.

4. The device according to claim 1, wherein the bristles are comprised of a synthetic polymer, treated natural material, or other material.

5. The device according to claim 1, wherein the bristles have diameters in a range of about 0.05 to 0.125 mm.

6. The device according to claim 1, wherein the bristles are affixed with an epoxy or glue to form the bristle retainer.

7. The device according to claim 1, wherein the orifice has a size in a range of from about 0.5 mm to 2.5 mm.

8. The device according to claim 1, wherein the brush retainer is tubular in shape.

9. The device according to claim 1, wherein the film forming formulation has a viscosity in a range of about 1500 to 2500 cps when measured at a temperature of 73.4±3.6° F. using a Brookfield RVT viscometer with spindle #4 at 50rpm.

10. The device according to claim 1, further comprising a siphon tube in the supply reservoir.

11. An applicator device comprising:
an applicator head having an adaptor and a brush comprised of bristles with the bristles affixed in a brush retainer with a brush diameter and a brush height above the brush retainer,
a supply reservoir having a neck for attachment to the adaptor of the applicator head, the supply reservoir containing a film forming formulation having a viscosity in a range of about 1500 to 2500 cps when measured at a temperature of 73.4±3.6° F. using a Brookfield RVT viscometer with spindle #4 at 50 rpm, and
wherein the brush diameter is in a range of about 0.4 inches to 1.3 inches and the brush height above the brush retainer is in a range of about 0.5 inches to 1.1 inches.

12. The device according to claim 11, further comprising a siphon tube in the supply reservoir.

13. The device according to claim 11, further comprising a protective cap for attachment to the applicator head.

14. The device according to claim 11, wherein the supply reservoir is comprised of a polymer material selected from the group consisting of polyethylene, polyethylene terephthalate and polybutylene terephthalate, and combinations thereof.

15. The device according to claim 11, wherein the bristles are comprised of a synthetic polymer, treated natural material, or other material.

16. The device according to claim 11, wherein the bristles have diameters in a range of about 0.05 to 0.125 mm.

17. The device according to claim 11, wherein the bristles are affixed with an epoxy or glue to form the bristle retainer.

18. The device according to claim 11, wherein the orifice has a size in a range of from about 0.5 mm to 2.5 mm.

19. The device according to claim 11, wherein the brush retainer is tubular in shape.

20. A kit comprising:
an applicator device for applying a film forming formulation, the applicator device having an applicator head having an adaptor and a brush comprised of bristles with the bristles affixed in a brush retainer with a brush diameter and a brush height above the brush retainer, wherein the brush diameter is in a range of about 0.4 inches to 1.3 inches and the brush height above the brush retainer is in a range of about 0.5 inches to 1.1 inches, and
a film forming formulation comprised of a binder selected from the group consisting of acrylic, styrene-butadiene rubber (SBR), polyvinyl acetate (PVAc), ethylene-vinyl acetate (EVA), and a combination thereof.

21. The kit according to claim 20, further comprising a siphon tube in applicator device.

22. The kit according to claim 20, further comprising a protective cap for attachment to the applicator head.

23. The kit according to claim 20, wherein the supply reservoir is comprised of a polymer material selected from the group consisting of polyethylene, polyethylene terephthalate and polybutylene terephthalate, and combinations thereof.

24. The kit according to claim 20, wherein the bristles are comprised of a synthetic polymer, treated natural material, or other material.

25. The kit according to claim 20, wherein the bristles have diameters in a range of about 0.05 to 0.125 mm.

26. The kit according to claim 20, wherein the bristles are affixed with an epoxy or glue to form the bristle retainer.

27. The kit according to claim 20, wherein the orifice has a size in a range of from about 0.5 mm to 2.5 mm.

28. The kit according to claim 20, wherein the brush retainer is tubular in shape.

29. The kit according to claim 20, wherein the film forming formulation has a viscosity in a range of about 1500 to 2500 cps when measured at a temperature of 73.4±3.6° F. using a Brookfield RVT viscometer with spindle #4 at 50 rpm.

* * * * *